Aug. 3, 1937.  C. P. STOCKER  2,088,619

FREQUENCY REDUCING SYSTEM

Filed Jan. 14, 1936

INVENTOR

Talesman P. Stocker

Patented Aug. 3, 1937

2,088,619

UNITED STATES PATENT OFFICE 2,088,619

FREQUENCY REDUCING SYSTEM

Closman P. Stocker, Lorain, Ohio, assignor of one-half to E. M. Heavens, Elyria, Ohio Application January 14, 1936, Serial No. 59,064

26 Claims. (Cl. 172—281)

This invention relates to frequency reducing systems and more particularly to static frequency reducing systems employing a non-linear impedance element.

The systems herein described consist essentially of a resonant circuit containing a non-linear impedance element which is tuned to a fundamental frequency lower than the frequency of the power supply. In such a circuit if an alternating current of the fundamental or resonant frequency is caused to flow in the circuit and if in doing so causes an harmonic voltage to be produced and an harmonic current to flow then if this harmonic voltage or current is supplied to the resonant circuit, current of the fundamental frequency may be maintained. It is, however, necessary first to start a current of the fundamental frequency in the resonant circuit. Furthermore, if the load connected to this circuit be increased above a certain value the fundamental current abruptly stops and must be started again.

It is an object of this invention to increase the ease of starting the fundamental current flowing in the resonant circuit and to increase the stability of the circuit so that changes in the load impedance will not tend to stop abruptly the fundamental current in the resonant circuit.

As used in this specification, the term "fundamental current" is current having the same frequency as the resonant frequency of the reducing system. The term "harmonic" refers to a multiple of the fundamental frequency. For example, the third harmonic current or voltage has a frequency three times the frequency of the fundamental current.

There are various methods of starting a current of fundamental frequency flowing in the resonant circuit. Many of these methods employ a transient voltage which, if of sufficient magnitude will start a current of fundamental frequency flowing in the resonant circuit. Thus U. S. Patent 1,633,481 granted to J. G. Fallou describes one method in which the condenser in the resonant circuit is charged from the supply voltage and then discharged into the resonant circuit. In my copending application Serial No. 24,635 filed June 3, 1935, I have described a method in which energy is stored in the magnetic field of the inductance coil and then discharged into the resonant circuit.

In all these methods the magnitude of the starting transient voltage or current produced in the resonant circuit is a function of the size of the circuit elements and the voltage of the power supply. Thus the ease of starting the fundamental current is also a function of the size of the elements and voltage applied to the circuit elements.

However, the power output and the stability of these circuit arrangements are also a function of the relative sizes of the circuit elements and the voltage of the power supply. In many cases the most desirable tuning, that is the most desirable values or relative values of the circuit elements from the standpoint of stability and power output of the circuit, are not the most desirable values from the standpoint of starting. Under these conditions it is necessary to change the constants of the circuit elements for starting and operating, or to select compromise values for the circuit elements.

In accordance with one feature of this invention, a starting arrangement is provided in which the magnitude of the starting transient may be adjusted independently of the tuning or relative values of the elements of the resonant circuit. Thus the values of the elements of the resonant circuit may be adjusted so as to secure the greatest circuit stability or output power and at the same time the starting transient voltage or current adjusted to have a maximum amplitude. This increases the ease with which the fundamental current may be started and also the maximum power output or stability of the circuit.

Another object of this invention is to increase further the stability of the circuit. When the load increases above a critical value the fundamental current flowing in the resonant circuit abruptly stops and must be restarted. It may be prevented or greatly reduced by connecting an impedance in the output circuit in series with the load. This tends to make the output voltage decrease much faster with load. This rapid decrease may be prevented to a certain extent by shunting the impedance until a definite load is applied at which time the impedance is inserted in the output circuit.

A further feature of this invention resides in the discovery that a capacitive impedance connected in series with the output circuit tends to increase the stability of the circuit and at the same time to increase the effective potential in series with the output circuit. This tends to hold the output voltage more constant with different loads.

These and other objects and features of this invention may be more readily understood from the following description of several specific embodiments of my invention when read with reference to the attached drawing in which.

The same elements of my improved frequency reducing arrangement have been designated with the same numbers in all the figures.

Figure 1:
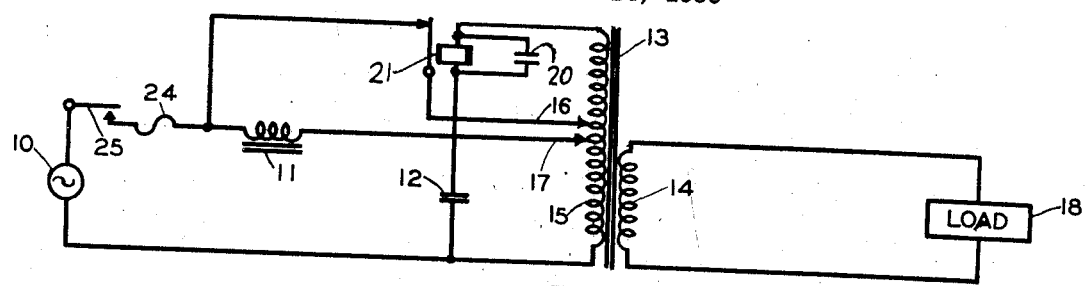
Fig. 1 shows a static frequency reducing arrangement with a starting arrangement in accordance with my invention.

Referring now to the embodiment of this invention shown in Fig. 1, a resonant circuit comprises a saturable inductance 11 and condenser 12 connected together through transformer 13. This resonant circuit is connected through some protective device 24, as for example a fuse, and a switch or circuit closing and interrupting device 25 to a source of alternating current power 10.

Source 10 may be or may include any suitable generator, transformer, power line, or network capable of supplying the necessary power at a suitable frequency to operate the circuit. An output winding 14 is wound on transformer 13 and connected to load 18.

The constants of the inductance 11, condenser 12, and transformer 13 and in particular tap 17 of transformer winding 15 are selected so that this circuit will resonate at a frequency such that the power supply frequency is an harmonic of this resonant frequency. Now if a current of the fundamental frequency is started in this resonant circuit it will be maintained unless the load becomes too great or the supply power or voltage fails.

As pointed out above there are various ways of supplying or starting a current of fundamental frequency in this resonant circuit. In most of the starting arrangements a large transient voltage is produced in the resonant circuit. If the transient is of sufficient magnitude a current of the fundamental frequency will start to flow in the resonant circuit which will then be maintained by the action of the non-linear impedance element or saturable inductance 11 in combination with the other circuit elements. In the usual starting arrangements the magnitude of this starting transient is largely determined by the tuning of the circuit.

For example if a large condenser 12 is employed than a large charge can be stored on the condenser, or if a large inductance 11 is employed then considerable energy can be stored in its magnetic field. If however, these elements are small they cannot store so much energy. Since it is the discharge of this energy which produces the starting transient and largely determines its magnitude, it is at once apparent that the ease of starting is controlled to a certain extent by the tuning of the circuit. The most desirable tuning for starting may not be the most desirable tuning for the operation of the circuit because that tuning must either be varied or else a compromise tuning must be employed.

In accordance with my improved starting arrangement, relay 21 connects through its break contact the source of power 10 directly to tap 16 of winding 15 of transformer 13. This applies a charge to condenser 12 through the winding of relay 21. Relay 21 is a little sluggish in operating so it does not operate until condenser 12 becomes charged. When relay 21 does operate it disconnects the starting circuit and tap 16, and allows the energy stored in condenser 12 to discharge through inductance 11. The discharge is of an oscillating type and has the same frequency as the fundamental frequency of the resonant circuit. It serves to start a current of this frequency flowing in the resonant circuit which is then maintained by the action of the non-linear impedance element or saturable inductance 11 in combination with the other circuit elements.

The voltage to which condenser 12 is charged may be readily adjusted by changing the position of tap 16 and thus the energy stored in the condenser may be controlled during starting. Changing the position of tap 16 however does not in any way affect the tuning or operation of the circuit after a current of the fundamental frequency is started in the resonant circuit and relay 21 operated. Thus in accordance with this invention the starting voltage applied to condenser 12 is controlled solely by the position of tap 16 of winding 15 while the tuning and operation of the circuit after being started is controlled solely by the position of tap 17 of winding 15 of transformer 13.

In the modified starting arrangement shown in Fig. 2 the starting tap 16 is below the inductance tap 17. This adjustment has a further advantage in that during starting a small reversed current flows through inductance 11 which tends to increase the amplitude of the transient voltage and thus to increase the ease of starting the circuit. This is particularly true when relay 21 operates at a point of the input alternating current cycle when the charge stored on condenser 12 is somewhat reduced because at this time the current through inductance 11 is a maximum and thus the energy stored in its magnetic field is also a maximum. The total energy available for producing the starting transient therefore tends to remain more nearly constant.

My improved starting arrangement has the further advantage in that condenser 12 may be used at maximum efficiency during both starting and operation. The fundamental voltage generated in the circuit is seldom the same as the applied harmonic voltage so unless both a starting tap and an operating tap are provided condenser 12 will not operate at its maximum efficiency under both conditions.

It is sometimes desirable to have some current, the frequency of which is an harmonic of the fundamental frequency, also flowing in the output circuit as well as the fundamental current. This is especially true if my frequency reducing arrangement is employed to supply 20-cycle ringing current for telephone ringing from 60-cycle commercial power systems in which case the harmonic serves as an audible ringing signal to the calling subscriber.

If it is desirable to supply such an harmonic in the output circuit in addition to the fundamental current, a condenser 20 may be connected in parallel with the winding of relay 21 as shown in Fig. 1. The condenser 20 and relay winding are adjusted or tuned to have a high impedance to the harmonic frequency desired.

Figure 2:
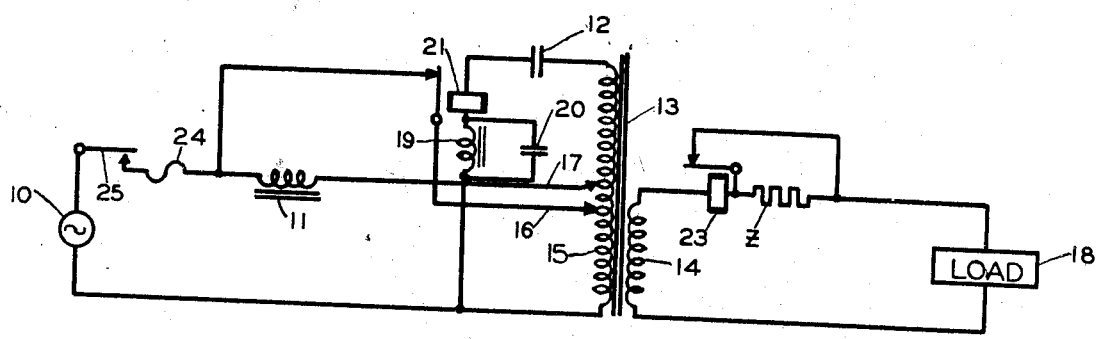
Fig. 2 shows a frequency reducing arrangement employing a modified starting arrangement and an additional stabilizing impedance; and, Fig. 3 shows the preferred embodiment of my improved starting and stabilizing arrangement.
Figure 3:
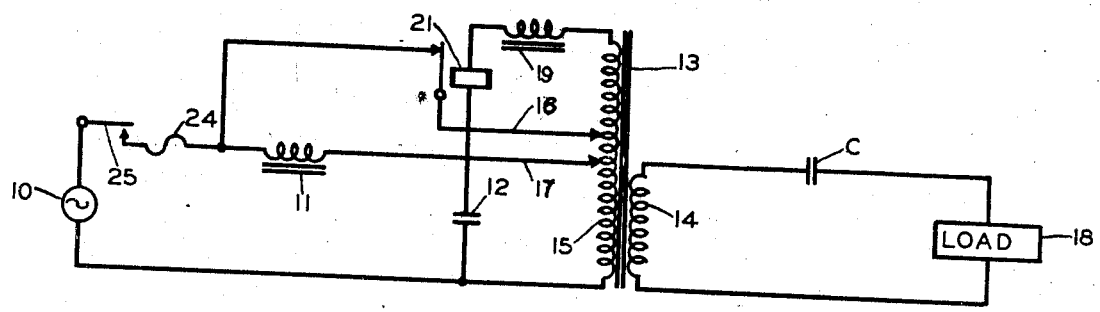

In case the winding of relay 21 does not have sufficient inductance a small inductance 19 may be added as shown in Figs. 2 and 3. In this case condenser 20 may be connected in parallel with inductance 19 as shown in Fig. 2 or in parallel with the series combination of inductance 19 and the winding of relay 21.

However, when an inductance 19 is added in series with the winding of relay 21, it is not always necessary to use condenser 20. As shown in Fig. 3 this condenser has been omitted because inductance 19 has sufficient impedance to cause the desired harmonic currents to flow in the output circuit. In case it is desired to have a plurality of harmonic currents flowing in the output circuit, the modification shown in Fig. 3 is to be preferred because the inductance presents a more uniform or constant impedance to the various harmonic currents than does a tuned circuit.

As described and claimed in my co-pending application Serial Number 24,635 filed June 3, 1935 transformer 13 provides, among other things, a stabilizing effect which permits a wide variation in the load without permitting the frequency of the fundamental current to change or stop flowing abruptly.

However, it is frequently desirable to use a frequency reducing arrangement for operating a number of devices in parallel. Under these conditions a trouble in one of the devices may stop the converter and thus all the other devices connected to the frequency converter. For example, if the frequency converter is used to ring telephone lines and it is attempted to ring on a grounded or short-circuited line the fundamental current will stop flowing and thus prevent ringing on the other lines until the fundamental current is again started after the line in trouble is disconnected from the converter.

Of course, an individual impedance element may be connected in series with each line or device connected to or comprising load 18. This is quite expensive and requires considerable space to mount all these impedance elements which also require frequent testing and replacing. In addition there is an appreciable voltage drop across the impedance element and also a power loss in it.

It is also possible to provide a single impedance element in series with the load but this increases the voltage drop across the series element. In order to reduce this voltage drop I have provided an improved arrangement in which the series impedance is short-circuited until the load current exceeds a critical value. A typical embodiment of this feature of my invention is shown in Fig. 2. Here impedance Z is connected in the output circuit. However, this impedance is short-circuited by contacts of relay 23. Relay 23 is a marginal relay and does not operate until the load current exceeds a definite value. Thus during normal operation the impedance does not affect the operation of my improved frequency reducer. However, when the output current increases above a definite value relay 23 operates and impedance Z is inserted in the load circuit which prevents changes in the load circuit from stopping the flow of the fundamental frequency current in the resonant circuit.

Another arrangement for improving the stability of this type of frequency reducer is shown in Fig. 3. I have discovered that if the series impedance in the output circuit is largely capacitive the stability of the circuit is greatly improved without materially affecting the output voltage or power in the normal operating range. In the embodiment shown in Fig. 3 condenser C provides this output impedance. As the load increases the effective capacity connected to transformer 13 also increases. This tends to increase the voltage of the fundamental current flowing in the resonant circuit and at the same time to increase the stability of the circuit with changes in the load circuit.

The following table clearly illustrates this action of the series condenser C applied to a typical frequency reducing circuit. In obtaining these figures the circuit was connected to a source 10 of 60-cycle alternating power having a voltage of 116. C was a 50 mfd. electrolytic condenser. Of course other types of condensers could be used.

| Resistance of load 18 in ohms | 20-cycle volts across load 18 | Watts output | Voltage across winding 14 | Capacity of C in mfd. | Volts across condenser C |
|---|---|---|---|---|---|
| ∞ | 92 | 0 | 92 | Short-circuited | 0 |
| 1700 | 91 | 4.9 | 91 | ---do--- | 0 |
| 1000 | 90 | 8.1 | 90 | ---do--- | 0 |
| 750 | 89 | 10.6 | 89 | ---do--- | 0 |
| 500 | 87 | 15.2 | 87 | ---do--- | 0 |
| 350 | 84 | 20.2 | 84 | ---do--- | 0 |
| 290 | 80 | 22.1 | 80 | ---do--- | 0 |
| 285 | | | 20-cycle current stops | | |
| ∞ | 92 | 0 | 92 | 50 | 0 |
| 1700 | 91 | 4.9 | 91 | 50 | 1 |
| 1000 | 89 | 8.9 | 91 | 50 | 10 |
| 750 | 88 | 10.4 | 90 | 50 | 15 |
| 500 | 85 | 14.5 | 89 | 50 | 25 |
| 250 | 74 | 22.0 | 86 | 50 | 41 |
| 150 | 61 | 24.8 | 86 | 50 | 47 |
| 100 | 49 | 24.0 | 88 | 50 | 69 |
| 50 | 30 | 18.0 | 93 | 50 | 85 |
| 0 | 0 | 0 | 99 | 50 | 99 |

It should be noted that without condenser C in the output circuit the fundamental or 20-cycle current abruptly stops when the load resistance falls below 290 ohms. However, with the condenser C of 50 mfd., in the output circuit of the same device under the same conditions the load resistance can be reduced to substantially zero without causing the 20-cycle current to stop. In addition for a rated output of 15 watts the load voltage is only 2 to 3 volts lower with the condenser than without the condenser. It should also be noted that as the load resistance is further decreased the voltage across winding 14 actually increases. This clearly shows the compounding action of this series condenser C.

The foregoing description of several specific embodiments of this invention is for the sole purpose of illustrating the features of my invention the novel features of which I will now set forth in the following claims:

What is claimed is:

1. A frequency reducing system adapted to be energized by a source of alternating current comprising a non-linear impedance element, a resonant circuit including said impedance element adapted to oscillate freely at a fundamental frequency when energized by the source of alternating current, means for causing a starting transient to flow in said resonant circuit, and means for adjusting the magnitude of said starting transient current.

2. A frequency reducing arrangement adapted to be energized by a source of alternating current comprising a saturable inductance, a condenser, a transformer connecting said inductance to said condenser to form a resonant circuit adapted to oscillate freely at a fundamental frequency when energized by the source of alternating current, means for charging said condenser from said source through said transformer to a higher voltage than the voltage of said source and means for discharging said charged condenser into said resonant circuit.

3. In a frequency reducing device adapted to be energized by a source of alternating current comprising, a condenser, a transformer, a saturable inductance, a resonant circuit including said condenser, transformer, and inductance adapted to oscillate freely at a fundamental frequency when energized by the source of alternating current, a starting arrangement connected to said circuit comprising means for storing energy in said condenser, means for storing energy in the magnetic field of said transformer, and means for simultaneously discharging the energy stored in both said condenser and transformer into said resonant circuit.

4. A frequency reducing arrangement adapted to be energized by a source of alternating current comprising a resonant circuit adapted to oscillate freely at a fundamental frequency when energized by the source of alternating current, a non-linear impedance element included therein, means for starting oscillations in said circuit, an output circuit, a stabilizing impedance connected in said output circuit, and means for short-circuiting said stabilizing element when a small load is connected to said output circuit.

5. A frequency reducing arrangement adapted to be energized by a source of alternating current comprising a resonant circuit adapted to oscillate freely at a fundamental frequency when energized by the source of alternating current, a non-linear impedance element included therein, means for starting oscillations in said resonant circuit, an output circuit, a compounding and stabilizing condenser connected in series with said output circuit.

6. A frequency reducing system adapted to be energized by a source of alternating current comprising a saturable inductance, a condenser, a transformer connecting said inductance and condenser together to form a resonant circuit adapted to oscillate freely at a fundamental frequency when energized by the source of alternating current, means for charging said condenser to a potential independent of the normal operating potential of said condenser, means for discharging said charged condenser into said resonant circuit, an output winding wound on said transformer, and means for increasing the harmonic currents of said fundamental frequency flowing in said output circuit connected to said resonant circuit.

7. In a frequency-reducing system including a non-linear inductance interlinked with a condenser in a circuit capable of sustained oscillation at a low frequency when supplied with current from a high-frequency source, a transformer having a given ratio of primary-to-secondary winding turns included in the interlinkage between the inductance and the condenser, and a starting connection and controlling means therefor for temporarily interlinking the source and the condenser through a different ratio of primary-to-secondary transformer turns in order to initiate sustained low-frequency oscillation between the inductance and the condenser.

8. In a frequency-reducing system including a non-linear inductance transformer-coupled with a condenser to produce a system capable of sustaining low frequency oscillation when supplied with current from a high frequency source, but requiring a transient condition for starting oscillation at a low frequency, a starting transformer coupling between said source and said condenser in which there is a different primary to secondary turn ratio from that in the first named transformer coupling.

9. In a frequency reducing system including a non-linear inductance interlinked with a condenser in a circuit capable of sustained oscillation at a low frequency when supplied with current from a high frequency source, a shunt-resonant couple serially related to said condenser and resonant to a frequency higher than the said low frequency, and output connections for supplying load current having a voltage wave form similar to that existing across the condenser, but modified by the action of said shunt-resonant couple.

10. In a frequency reducing system including a non-linear inductance interlinked with a condenser in a circuit capable of oscillation at a low frequency when supplied with current from a high-frequency source, a load lead extending from the oscillatory circuit to a supply current of reduced frequency to a variable load, a stabilizing impedance device associated with said load lead, and means automatically controlled according to the varying value of the connected load for including said impedance in the load lead and excluding it from the load lead.

11. In a frequency reducing system including a local circuit capable of oscillation at a reduced frequency when supplied with current from a source of high frequency, a load lead interlinked with said local circuit to supply reduced frequency current to a variable load, and a condenser inserted in said load lead of such a capacity as to have a compounding stabilizing effect on the low-frequency oscillations under conditions of widely varying load.

12. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, and automatic means to modify temporarily the electrical constitution of the said circuit to start the said oscillations.

13. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, means to modify temporarily the electrical constitution of the said circuit to start the said oscillations, and means for causing the current flowing to the capacitive element to govern the modifying means.

14. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, and automatic starting means to modify the electrical constitution of the said circuit to charge the capacitive element and to restore the electrical constitution of the said circuit when the capacitive element is charged to begin the free oscillations of said resonant circuit.

15. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, and automatic starting means connected in series with the capacitive element to modify the electrical constitution of the said circuit to charge the capacitive element and to restore the electrical constitution of the said circuit when the capacitive element is charged to begin the free oscillations of said resonant circuit.

16. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, and automatic starting means governed by the current flowing to the capacitive element to start the said oscillations.

17. A frequency reducing system adapted to be energized by a source of alternating current comprising, in combination, a resonant circuit having a non-linear impedance element and a capacitive element arranged to be energized by a source of alternating current and capable when once started to oscillate to maintain said oscillations at a frequency lower than the frequency of the source of alternating current, and an electrically operated starting device for detuning the said resonant circuit to store up energy in one of the said elements, and for restoring the tuning of the said resonant circuit to cause the stored energy to flow to the other element and begin the free oscillations of the said resonant circuit.

18. A frequency reducing system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to an intermediate portion of the transformer and having its forward side connected to the other of the said spaced input means, a starting relay having a winding and a contact, said winding being connected in series with the capacitive element, and means including the relay contact for connecting the forward side of the non-linear impedance element to an intermediate portion of the transformer to initially charge the capacitive element and for disconnecting the said forward side of the non-linear impedance element from the said intermediate portion of the transformer to cause the electrical charge of the capacitive element to flow to the non-linear impedance element to start free oscillations.

19. A frequency reducing system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to an intermediate portion of the transformer and having its forward side connected to the other of the said spaced input means, a starting relay having a winding and a contact, said winding being connected in series with the capacitive element, means including the relay contact for connecting the forward side of the non-linear impedance element to an intermediate portion of the transformer to initially charge the capacitive element and for disconnecting the said forward side of the non-linear impedance element from the said intermediate portion of the transformer to cause the electrical charge of the capacitive element to flow to the non-linear impedance element to start free oscillations, and inductance means associated with the oscillating circuit for causing an additional voltage to modify the wave form of the output voltage impressed upon the output means.

20. A frequency reducing system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to an intermediate portion of the transformer and having its forward side connected to the other of the said spaced input means, a starting relay having a winding and a contact, said winding being connected in series with the capacitive element, means including the relay contact for connecting the forward side of the non-linear impedance element to an intermediate portion of the transformer to initially charge the capacitive element and for disconnecting the said forward side of the non-linear impedance element from the said intermediate portion of the transformer to cause the electrical charge of the capacitive element to flow to the non-linear impedance element to start free oscillations, and inductance means connected in series with the capacitive element of the oscillating circuit for causing an additional voltage to modify the wave from the output voltage impressed upon the output means.

21. A frequency reducing system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to the transformer and having its forward side connected to the other of the said spaced input means, a starting relay having a winding and a contact, said winding being connected in series with the capacitive element, and means including the relay contact for connecting the forward side of the non-linear impedance element to the transformer to initially charge the capacitive element and for disconnecting the said forward side of the non-linear impedance element from the transformer to cause the electrical charge of the capacitive element to flow to the non-linear impedance element to start free oscillations.

22. In a system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to the transformer means, and automatic means for connecting the forward side of the non-linear impedance element to the transformer to initially charge the capacitive element and for disconnecting the said forward side of the non-linear impedance element from the transformer to cause the electrical charge of the capacitive element to flow to the non-linear impedance element to start free oscillations.

23. In a system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to the transformer means, automatic means for connecting the forward side of the non-linear impedance element to the transformer to initially charge the capacitive element and for disconnecting the said forward side of the non-linear impedance element from the transformer to cause the electrical charge of the capacitive element to flow to the non-linear impedance element to start free oscillations, and a condenser associated with said output means to give stability under conditions of widely varying load.

24. In a system adapted to be energized by a source of alternating current comprising, in combination, output means, a transformer for delivering a current of reduced frequency to the output means, two spaced input means adapted to be energized by the source of alternating current, a capacitive element connected in shunt circuit relation with the transformer and having one side connected to one of the two spaced input means, a non-linear impedance element having its rearward side connected to the transformer means, automatic means for connecting the forward side of the non-linear impedance element to the transformer to initially charge the capacitive element and for disconnecting the said forward side of the non-linear impedance element from the transformer to cause the electrical charge of the capacitive element to flow to the non-linear impedance element to start free oscillations, stabilizing impedance means associated with said output means, and means automatically controlled according to the varying value of the connected load for including said stabilizer impedance means in circuit relation with the output means and excluding it from circuit relation with the output means.

25. In an oscillating circuit having output means for energizing a widely varying load wherein the voltage across the output means tends to decrease with an increasing load, and a stabilizing capacitive element associated with the output means to maintain the voltage across the output means substantially constant with a varying load.

26. In a system adapted to be energized by a source of alternating current and arranged to deliver a substantially constant output voltage for wide voltage variations of the source of alternating current, in combination, an oscillating circuit having output means, said oscillating circuit being adapted to be energized by the source of alternating current and capable when once started to oscillate to maintain said oscillations at a voltage across the output means that is substantially constant for wide voltage variations of the source of alternating current, and an electrically operated starting device for detuning the said oscillating circuit to store up energy in a portion of said circuit and for restoring the tuning of the said oscillating circuit to cause the stored energy to flow to another portion of the said circuit and begin the free oscillations of the said oscillating circuit.

CLOSMAN P. STOCKER.